United States Patent
Bergner et al.

(10) Patent No.: US 10,914,370 B2
(45) Date of Patent: Feb. 9, 2021

(54) GEARSHIFT ASSEMBLY

(71) Applicant: Kongsberg Automotive AB, Mullsjö (SE)

(72) Inventors: Jonas Bergner, Bankeryd (SE); Tomas Kucka, Mullsjö (SE)

(73) Assignee: Kongsberg Automotive AB, Mullsjö (SE)

( * ) Notice: Subject to any disclaimer, the term of this patent is extended or adjusted under 35 U.S.C. 154(b) by 500 days.

(21) Appl. No.: 15/748,526

(22) PCT Filed: Jul. 6, 2015

(86) PCT No.: PCT/EP2015/065333
§ 371 (c)(1),
(2) Date: Jan. 29, 2018

(87) PCT Pub. No.: WO2017/005288
PCT Pub. Date: Jan. 12, 2017

(65) Prior Publication Data
US 2018/0223897 A1    Aug. 9, 2018

(51) Int. Cl.
*F16H 59/02* (2006.01)
*F16C 11/06* (2006.01)

(52) U.S. Cl.
CPC .......... *F16H 59/02* (2013.01); *F16C 11/0609* (2013.01); *F16C 2361/65* (2013.01);
(Continued)

(58) Field of Classification Search
CPC .. B60K 20/02; F16C 11/0604; F16C 11/0609; F16C 2361/65; F16H 59/02;
(Continued)

(56) References Cited

U.S. PATENT DOCUMENTS 2,733,085 A * 1/1956 Latzen ................ F16C 11/0604
                                            403/128
5,626,057 A * 5/1997 Nishigai ................ F16H 59/04
                                            403/130
(Continued)

FOREIGN PATENT DOCUMENTS

CN      102364167 A      2/2012
EP      0168663 A2 *     1/1986   .......... F16C 11/0614
(Continued)

OTHER PUBLICATIONS

Translation of CN102364167. Bao, et al. Manual gear-shifting operating mechanism of automobile. Feb. 29, 2012.*
(Continued)

*Primary Examiner* — Josh Skroupa
(74) *Attorney, Agent, or Firm* — Howard & Howard Attorneys PLLC

(57) ABSTRACT

A gearshift assembly comprises a base and a shift lever having an overmoulded ball portion comprising a pattern of recesses having straight side walls. A socket is fixed in the base and shaped to receive the ball portion of the shift lever. The socket has a sidewall with an inner surface forming part of a sphere to provide a pivotal mounting for the ball portion for pivotal movement of the shift lever over a pivotal movement range. Vertical slots in the sidewall which have parallel vertical side edges that are open at their upper ends to allow a sidewall portion between adjacent vertical slots to elastically flex outwardly during insertion of the ball portion into the socket. The pattern of recesses of the ball portion is arranged such that all sidewalls are inclined with respect to side edges of the vertical slots over the pivotal movement range.

12 Claims, 3 Drawing Sheets

(52) U.S. Cl.
CPC ............... *F16H 2059/0269* (2013.01); *Y10T 403/32696* (2015.01)

(58) Field of Classification Search
CPC .............. F16H 2059/0269; G05G 1/04; Y10T 403/32681; Y10T 403/32696; Y10T 403/32704; Y10T 74/20171
USPC ....................... 403/128, 130, 131; 74/473.34
See application file for complete search history.

(56) References Cited

U.S. PATENT DOCUMENTS

| | | | | |
|---|---|---|---|---|
| 9,464,662 | B2 * | 10/2016 | Lee | F16C 11/0604 |
| 2003/0019106 | A1 * | 1/2003 | Pope | F16C 11/0604 29/898 |
| 2016/0363162 | A1 * | 12/2016 | Richeson | F16C 11/0604 |

FOREIGN PATENT DOCUMENTS

| | | | | |
|---|---|---|---|---|
| EP | 404613 A1 * | 12/1990 | ..... | F16H 2059/0269 |
| JP | 2001242950 A | 9/2001 | | |
| WO | WO-2014002888 A1 * | 1/2014 | ............ | B60K 20/02 |

OTHER PUBLICATIONS

Translation of JP2001242950. Yamamoto, Ichiro. Shift Lever. Jan. 30, 2003.*
International Search Report for International Application No. PCT/EP2015/065333 dated May 19, 2016, 3 pages.
English language abstract for CN102364167A extracted from espacenet.com database on Jul. 19, 2018, 1 page.
English language abstract for JP2001242950A extracted from espacenet.com database on Jul. 19, 2018, 1 page.

* cited by examiner

GEARSHIFT ASSEMBLY

CROSS-REFERENCE TO RELATED APPLICATIONS

This application is the National Stage of International Patent Application No. PCT/EP2015/065333, filed on Jul. 6, 2015, the content of which is incorporated herein by reference.

FIELD OF THE DISCLOSURE

This disclosure generally relates to a gearshift assembly for a motor vehicle.

SUMMARY OF THE DISCLOSURE

The present invention relates to a gearshift assembly comprising base, a shift lever having an overmoulded ball portion which is received in a socket fixed in the base, the socket having a sidewall with an inner surface forming part of a sphere to provide a pivotal mounting for the ball portion for pivotal movement of the shift lever over a pivotal movement range, the socket having vertical slots in the sidewall which have parallel vertical side edges and which are open at their upper ends to allow a sidewall portion between adjacent vertical slots to elastically flex outwardly during insertion of the ball portion into the socket, the ball portion comprising a pattern of recesses, each recess having straight side walls.

A gearshift assembly can for example have two shifting gates, for example one for automatic mode and one for manual mode; another example is a gearshift assembly for a manual trans-mission where a first shifting gate contains the reverse gear, a second shifting gate the first and second gear and so on. The shift lever can be pivoted about a first axis along one of the shifting gates, and about a second axis perpendicular to the first axis between the shifting gates. Such pivotal mounting of the shift lever is typically accomplished by ball portion on the shift lever which is received in a complementary spherical socket that is fixed in a base of the gearshift assembly. The present invention relates to gearshift assemblies in which the ball portion is formed by injection moulding as an overmoulded plastic ball portion on the shift lever. Due to the manufacturing process it is not possible to form the ball portion as full solid ball portion of plastic. One of the reasons is that due to the varying thickness of plastic material, namely the decreasing thickness starting from the equator of the ball portion in both directions, the shrinking of the plastic material would result in a non-spherical surface of the finished moulded plastic portion. To compensate this it is known that the amount of plastic material has to be reduced by including recesses or indentations distributed over the ball portion. In particular it is known that objects to be formed by injection moulding should consist of an arrangement of rather thin walls of uniform thickness to avoid deformation and warping.

In case of forming a ball portion by thin wall injection moulding this leads to a structure as shown in FIG. 3 which shows the pivotal mounting of the shift lever of a known gearshift assembly, wherein the socket is shown in cross-section and the ball portion in a side view. As can be seen the ball portion is provided with a regular pattern of recesses with square cross-section (except for recesses close to the surface of the sphere which deviate from a square cross-section). Series of square recesses are formed vertically on top of each other with the straight vertical sidewalls aligned and extending parallel to the longitudinal axis of the shift lever. The recesses extend downwardly almost to the surface of the shift layer, i.e. only a thin plastic layer is remaining on the bottom of the recess above the surface of the shift lever. In fact most of the material of the ball portion except for the thin layer of plastic above the surface of the shift lever is contained in these thin perpendicular wall portions. In this manner one can view the spherical ball portion around the shift lever as a grid comprising a number of parallel vertical wall portions interconnected by a number of parallel horizontal walls.

The socket for receiving the ball portion is open on the upper and the lower side such that the shift lever can extend through the socket, and such that the ball portion can be inserted into the socket by pushing it downwards into the socket. In order to allow such insertion of the ball portion into socket, the socket has to be elastic. In addition the socket is provided with vertical slots extending through the sidewall of the socket from an open upper end of the socket through a part of the vertical extension of the sidewall of the socket. Several vertical slots are distributed around the circumference of the socket. This design allows that each circumferential wall portion between two adjacent vertical slots is able to elastically flex outwardly in order to let the ball portion pass during insertion, whereafter the sidewall portion elastically returns to embrace the ball portion.

In this known design the vertical sidewalls of the recesses are extending parallel to the vertical edges defining the vertical slots in the sidewall of the socket. Due to this alignment of the straight vertical sidewalls of the recesses and of the edges of the vertical slots in the sidewall of the socket it occurs during shift movements that several aligned straight vertical sidewalls of recesses pass vertical edges of the vertical slots of the socket. It has been found that a feeling of a slight jerk or unevenness is experienced when the driver performs such shift movement including movement of the aligned straight vertical side walls of the recesses over straight side edges of the vertical slots in sidewall of the socket.

It is an object of the present invention to arrange a gearshift assembly of this kind in such that shift movements of the shift lever proceed in a smooth and steady manner, without any feed-back feeling of jerks or unevenness.

This object is achieved by a gearshift assembly comprising the features of claim 1. Preferred embodiments are set out in the dependent claims.

According to the present invention the pattern of the recesses in the ball portion is arranged such that the sidewalls of the recesses are inclined or disaligned with respect to side edges of the vertical slots over the pivotal movement range of the shift lever. In other words the sidewalls are inclined with respect to the longitudinal axis of the recesses by an angle of inclination such that they never assume a vertical orientation over the pivotal movement range of the shift lever.

In a preferred embodiment the recess pattern comprises series of recesses extending along the ball portion. Between adjacent series of recesses inclined wall portions of the overmoulded ball portion are formed which are disaligned with the vertical slots over the entire pivot movement range of the shift lever.

In a preferred embodiment the recesses are rectangular in cross-section, and in each of the series of recesses the recesses have two opposite side walls aligned in the direction of the extension of the series of recesses. In this manner wall portions of uniform thickness are formed between adjacent series of recesses.

In a preferred embodiment the recesses have a square cross-section rotated by 45° with respect to the longitudinal axis of the shift lever.

Preferably the longitudinal line of extension of each series of recesses is oriented at an angle of 45° with respect to the longitudinal axis of the shift lever.

BRIEF DESCRIPTION OF THE FIGURES

The present invention will now be described with reference to preferred embodiment shown in the drawings in which.

DETAILED DESCRIPTION OF THE DISCLOSURE

Figure 3:
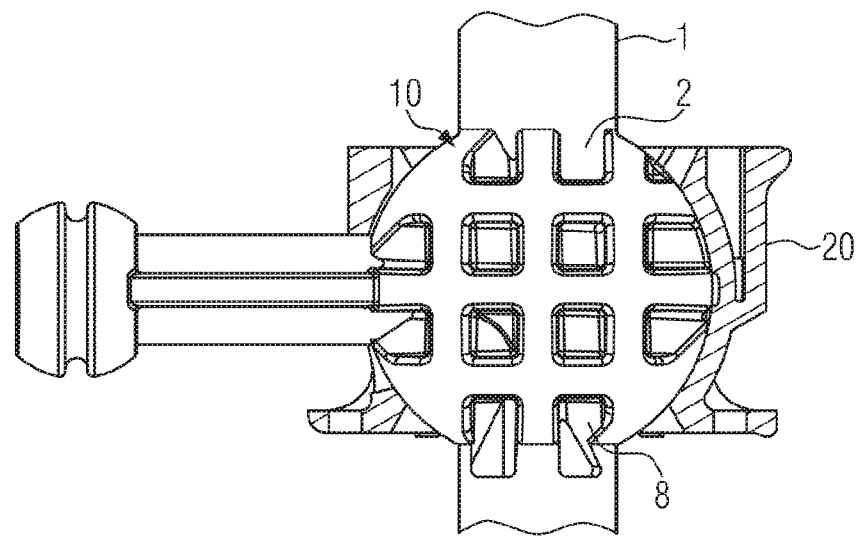
FIG. 3 shows a view corresponding to FIG. 2 for a prior art gearshift assembly.
Figure 4:
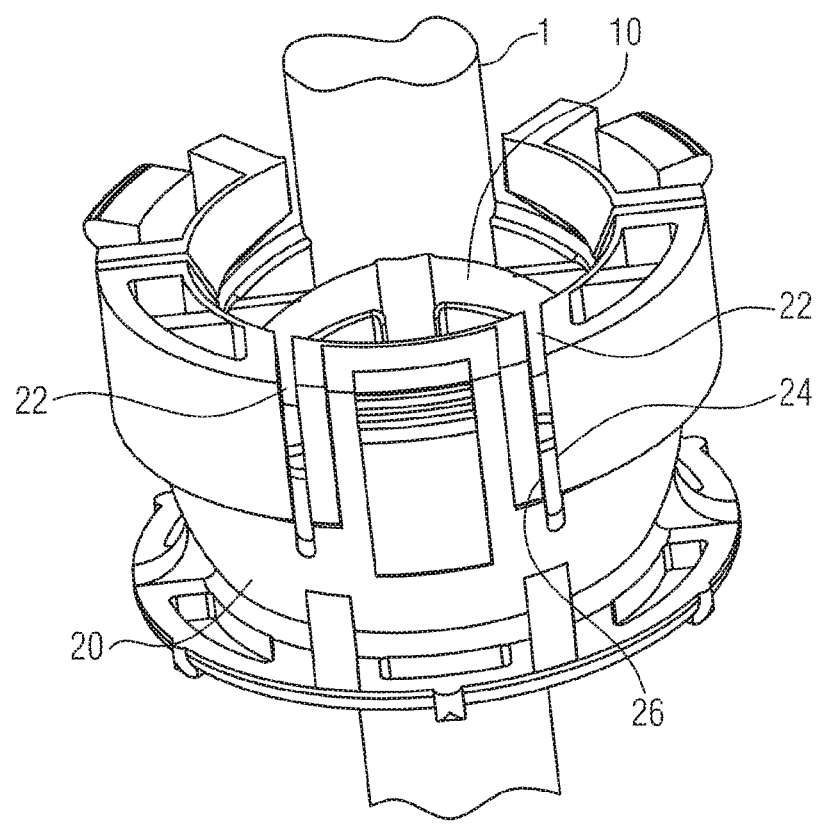
FIG. 4 shows a partial view of the pivotal mounting of the shift lever of the prior art gearshift assembly of FIG. 3.

FIGS. 3 and 4 show the pivotal mounting of the shift lever 1 of a prior art gearshift assembly. The pivotal mounting comprises a socket 20 which is fixed in a base (not shown) to be mounted in a vehicle cabin. The inner surface of the socket is spherical and embraces a ball portion 10 formed on the shift lever 1 to form a ball joint. As can be seen in FIG. 4 the sidewall of the socket 20 is provided with vertical slots 22 distributed around the circumference of the socket 20. Each vertical slot 22 has opposite vertical side edges 24 and 26.

As shown in FIG. 3 the ball portion 10 of the shift lever 1 is provided with a pattern of recesses including recesses of square-shape which are arranged in a vertically extending series 2, 4, 6 and 8; several such series of recesses 2, 4, 6 and 8 are provided. The vertical sidewalls of the recesses are aligned with the side edges 24, 26 of the vertical slots 22. The recesses extend downwards almost to the surface of the shift lever so that only a thin plastic layer is remaining at the bottom of the recesses over the shift lever surface. In this manner a grid of parallel vertical wall portions and interconnecting horizontal wall portions define the body of the ball portion, wherein the major part of ball portion material is contained in these wall portion of uniform thickness.

When such a series of vertical sidewalls of recesses 2, 4, 6 and 8 passes side edges 24, 26 of vertical slots 22 during a shift movement a feeling of a slight jerk or unevenness is resulting.

Figure 1:
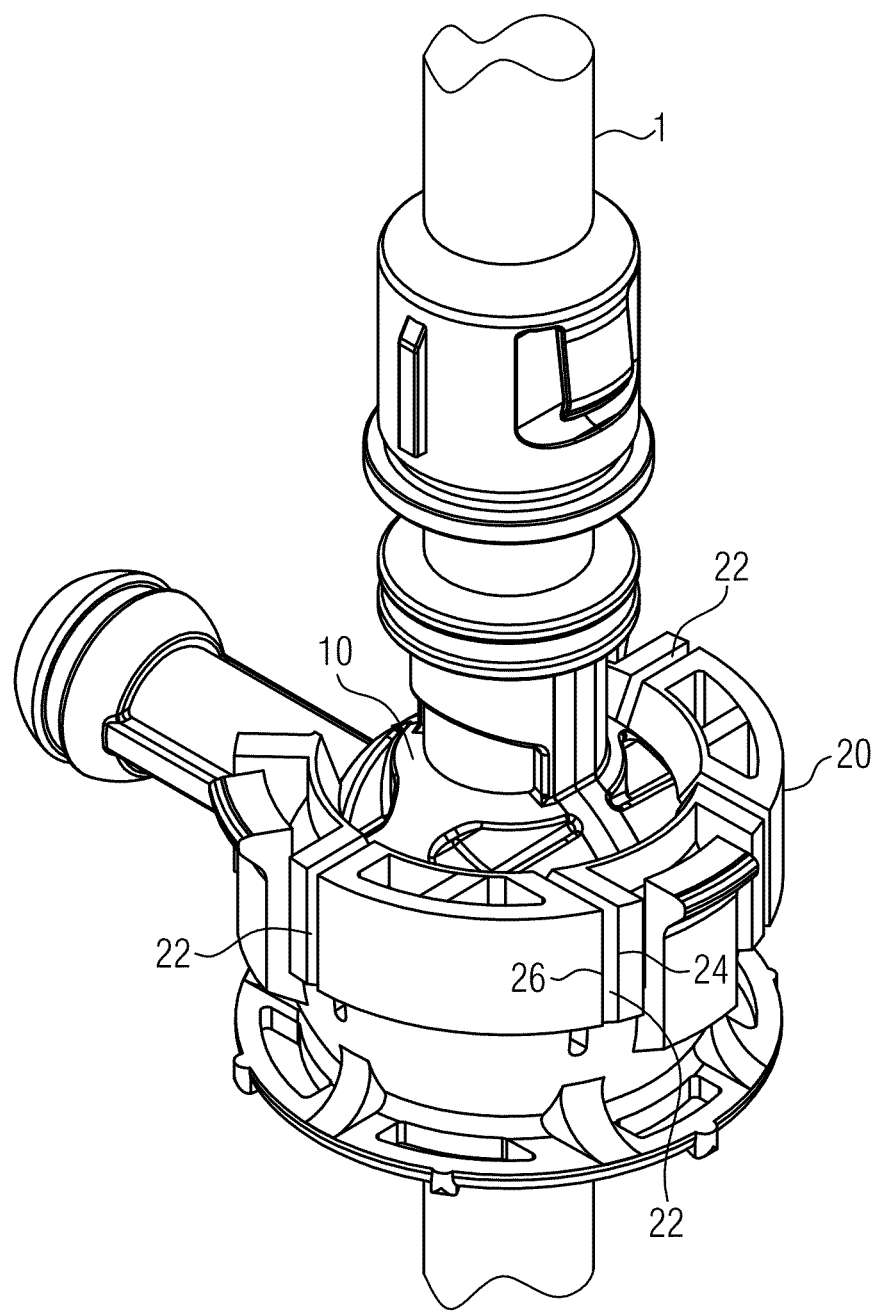
FIG. 1 shows a partial view of the pivotal mounting of the shift lever of a gearshift assembly.
Figure 2:
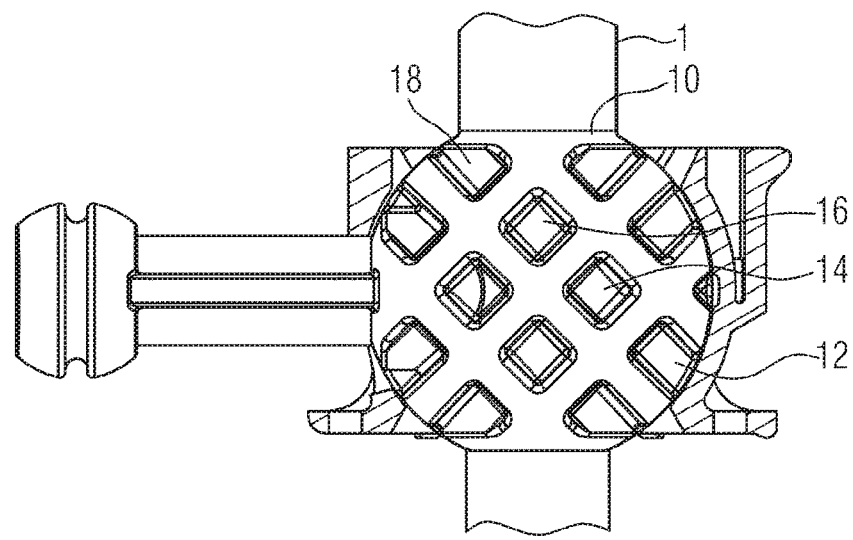
FIG. 2 shows a partial view of the pivotal mounting of the gearshift assembly, partially in cross-section.

In FIGS. 1 and 2 the pivotal mounting of the shift lever 1 of a gearshift assembly according to the invention is shown. As can be seen in FIG. 2 the pattern of recesses is arranged such that the straight sidewalls of the recesses are inclined with respect to the vertical side edges 24, 26 of the vertical slots 22 in the socket, wherein the angle of inclination is large enough such that the straight sidewalls of the recesses 12, 14, 16, 18 are disaligned with the vertical side edges 24, 26 of the vertical slots over the entire pivotal movement range of the shift lever 1 during shift movements. In the embodiment shown in FIG. 2 the angle of inclination of the straight side walls of the recesses 12, 14, 16, and 18 is about 45° when the shift lever 1 is in a central position.

As can be seen in FIG. 2 the individual recesses, and the series of recesses 12, 14, 16 and 18 are tilted by 45° with respect to the longitudinal axis of the shift lever 1 compared to the arrangement of FIG. 3. In this manner also the thin wall portions formed between adjacent series of recesses, which were oriented vertically and horizontally in FIG. 3, are now tilted by 45° in either direction with respect to the longitudinal axis of the shift lever. As described for the prior art with respective FIG. 3 the recesses 12, 14, 16 and 18 also extend downwardly almost to the surface of the shift lever 1. In this manner only a thin plastic layer is remaining at the bottom of the recesses above the shift lever surface so that most of the material that makes up the ball portion is contained in the grid of crossing wall portions formed between adjacent series of recesses.

According to the invention the straight side walls of the grid of crossing wall portions are inclined with respect to the longitudinal direction of the shift lever such that they are never aligned with the vertical side edges 14, 16 of the vertical slots 22 of the socket over the pivotal movement range of the shift lever.

The invention claimed is:

1. A gearshift assembly, said gearshift assembly comprising:
   a shift lever having an overmoulded ball portion comprising a pattern of recesses having straight side walls,
   a base, and
   a socket fixed in the base and shaped to receive the ball portion of the shift lever, the socket having:
      a sidewall with an inner surface forming part of a sphere to provide a pivotal mounting for the ball portion for pivotal movement of the shift lever over a pivotal movement range,
      vertical slots in the sidewall which have parallel vertical side edges and which are open at their upper ends to allow a sidewall portion between adjacent vertical slots to elastically flex outwardly during insertion of the ball portion into the socket,
   wherein the pattern of recesses of the ball portion is arranged such that all sidewalls of the recesses are inclined with respect to side edges of the vertical slots over the pivotal movement range of the shift lever.

2. The gearshift assembly according to claim 1, wherein the pattern of recesses comprises series of recesses extending along the ball portion.

3. The gearshift assembly according to claim 2, wherein the recesses are rectangular in cross-section with two opposite side walls aligned in the direction of the extension of each series of recesses.

4. The gearshift assembly according to claim 3, wherein the recesses have square cross-sections.

5. The gearshift assembly according to claim 4, wherein the longitudinal line of extension of each series of recesses is oriented at an angle of 45° with respect to the longitudinal axis of the shift lever.

6. The gearshift assembly according to claim 1, wherein the recesses are rectangular in cross-section with two opposite side walls aligned in the direction of the extension of each series of recesses.

7. The gearshift assembly according to claim 1, wherein the recesses have square cross-sections.

8. The gearshift assembly according to claim 1, wherein the longitudinal line of extension of each series of recesses is oriented at an angle of 45° with respect to the longitudinal axis of the shift lever.

9. The gearshift assembly according to claim 1, wherein the pattern of recesses is arranged such that the straight sidewalls of the recesses are inclined with respect to the vertical side edges of the vertical slots in the socket, wherein an angle of inclination is large enough such that the straight sidewalls of the recesses are misaligned with the vertical side edges of the vertical slots over the entire pivotal movement range of the shift lever during shift movements.

10. The gearshift assembly according to claim 1, wherein the recesses extend downwardly towards the surface of the shift lever.

11. The gearshift assembly according to claim 1, wherein a plastic layer is remaining at the bottom of the recesses above the shift lever surface so that most of the material that makes up the ball portion is contained in the grid of crossing wall portions formed between adjacent series of recesses.

12. The gearshift assembly according to claim 1, wherein the straight side walls of the grid of crossing wall portions are inclined with respect to the longitudinal direction of the shift lever such that they are never aligned with the vertical side edges of the vertical slots of the socket over the pivotal movement range of the shift lever.

\* \* \* \* \*